(12) United States Patent
Li

(10) Patent No.: US 10,788,700 B1
(45) Date of Patent: Sep. 29, 2020

(54) REFLECTIVE LIQUID CRYSTAL DISPLAY PANEL, DISPLAY DEVICE, AND CONTROL METHOD THEREOF

(71) Applicant: BOE TECHNOLOGY GROUP CO., LTD., Beijing (CN)

(72) Inventor: Zhongxiao Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/534,004

(22) Filed: Aug. 7, 2019

(30) Foreign Application Priority Data

Apr. 16, 2019 (CN) .......................... 2019 1 0304573

(51) Int. Cl.
*G02F 1/1335* (2006.01)
*G02F 1/1343* (2006.01)
*G02F 1/1333* (2006.01)

(52) U.S. Cl.
CPC ...... *G02F 1/133553* (2013.01); *G02F 1/1343* (2013.01); *G02F 1/133512* (2013.01); *G02F 1/133528* (2013.01)

(58) Field of Classification Search
CPC ............ G02F 1/1333; G02F 1/133345; G02F 1/133362; G02F 1/1343; G02F 1/1335; G02F 1/133528; G02F 1/133512; G02F 1/133509; G02F 1/133553; G02F 1/134336; G02F 1/134309; G02F 1/1336; G02F 1/133605; G02F 1/133615; G02F 1/133707; G02F 1/134363; G02F 1/133504; G02F 1/133524; G02F 1/133606; G02F 2201/123; G02F 2001/134372; G02F 2001/134381; G02F 2001/133357; G02F 2001/133607; G02F 2001/133618; G02F 2001/133548; G02F 2203/02; G09G 2300/0439; G09G 2360/144; G02B 6/0031; G02B 6/0033; G02B 6/0055; G02B 27/0101; G02B 5/3058

See application file for complete search history.

(56) References Cited

U.S. PATENT DOCUMENTS

2007/0165167 A1* 7/2007 Tsai .................. G02F 1/136213
                                                            349/130

* cited by examiner

*Primary Examiner* — Thoi V Duong
(74) *Attorney, Agent, or Firm* — The Webb Law Firm

(57) ABSTRACT

A reflective liquid crystal display panel comprises: a first substrate, a second substrate, and a liquid crystal layer disposed therebetween; a layer of first electrode disposed between the first substrate and the liquid crystal layer; a layer of second electrode disposed between the second substrate and the liquid crystal layer and comprising a first sub-electrode and a second sub-electrode; a reflective structure disposed between the first substrate and the layer of first electrode; a first light-shielding layer disposed between the second substrate and the layer of second electrode, the first light-shielding layer having a plurality of openings including a light extraction opening; and a light extraction structure disposed on the second substrate in correspondence with the light-extraction opening, and configured to extract light from the second substrate and pass the extracted light through the light-extraction opening and the liquid crystal layer to the reflective structure.

17 Claims, 4 Drawing Sheets

REFLECTIVE LIQUID CRYSTAL DISPLAY PANEL, DISPLAY DEVICE, AND CONTROL METHOD THEREOF

CROSS-REFERENCE TO THE RELATED APPLICATION

The present application claims priority to Chinese Application No. 201910304573.6, filed on Apr. 16, 2019, of which the entirety is incorporated therein by reference.

TECHNICAL FIELD

The present disclosure relates to the field of display technologies, and in particular, to a reflective liquid crystal display panel, a display device, and a control method thereof.

BACKGROUND

The liquid crystal display is a display device which is currently used on a large scale, and has a series of advantages such as high color gamut, light weight, and fast response time, and has mature technologies in theoretical research and practical processes. In indoor scenes, the brightness of the display is sufficient to meet the needs of viewing; in an outdoor environment, due to the greater brightness of ambient light, the display is often required to have higher brightness.

In view of the above situation, a reflective liquid crystal display panel has been developed, which realizes display by using ambient light itself, which can effectively avoid the situation that the brightness of the reflective liquid crystal display panel is insufficient due to excessive ambient light brightness; and the front light source is used in ambient light brightness. In the low case, the backlight is used for display.

However, in the related art, the reflective liquid crystal display panel has poor contrast and the display effect is not satisfactory. Moreover, the reflective liquid crystal display panel is thick, which is not conducive to thin and light design.

SUMMARY

According to an aspect of the present disclosure, there is provided a reflective liquid crystal display panel comprising: a first substrate; a second substrate disposed opposite to the first substrate; a liquid crystal layer disposed between the first substrate and the second substrate; a layer of first electrode disposed on a side of the first substrate facing the second substrate and between the first substrate and the liquid crystal layer; a layer of second electrode disposed on a side of the second substrate facing the first substrate and between the second substrate and the liquid crystal layer, the layer of second electrode comprising a first sub-electrode and a second sub-electrode disposed independently of each other; a reflective structure disposed between the first substrate and the layer of first electrode; a first light-shielding layer disposed on the second substrate and between the second substrate and the layer of second electrode, the first light-shielding layer having a plurality of openings including a light extraction opening; and a light extraction structure disposed on the second substrate in correspondence with the light-extraction opening and between the second substrate and the layer of second electrode, and configured to extract light from the second substrate and pass the extracted light through the light-extraction opening and the liquid crystal layer to the reflective structure.

In some embodiments, the plurality of openings including a light exit opening spaced apart from the light extraction opening, and configured to emit therethrough the light which is reflected back by the reflective structure, the reflective liquid crystal display panel further comprising: a first filter structure disposed at the light exit opening; a second light-shielding layer disposed on a side of the second substrate facing away from the first substrate, and disposed opposite to the light extraction structure.

In some embodiments, the light incident to the reflective structure is reflected through the liquid crystal layer to any one of: the light exit opening and/or the first light-shielding layer.

In some embodiments, the second light-shielding layer is configured such that an orthogonal projection of the second light-shielding layer on the second substrate covers an orthogonal projection of the light extraction structure on the second substrate.

In some embodiments, an area of the orthogonal projection of the second light-shielding layer is larger than an area of the orthogonal projection of the light extraction structure.

In some embodiments, the reflective liquid crystal display panel further comprises: a first filter structure disposed at the light exit opening; a second light-shielding layer disposed on a side of the second substrate facing away from the first substrate, and disposed corresponding to the light extraction structure.

In some embodiments, the light incident to the reflective structure is reflected through the liquid crystal layer to the light exit opening and/or the first light-shielding layer.

In some embodiments, the second light-shielding layer is disposed in alignment with the light extraction structure.

In some embodiments, an area of the second light-shielding layer is larger than an area of the light extraction structure.

In some embodiments, the reflective liquid crystal display panel further comprises: a first planarization layer disposed between the first substrate and the first electrode, wherein the reflective structure is disposed in the first planarization layer.

In some embodiments, the second substrate comprises: a glass substrate; a first low-refraction layer attached to a side of the glass substrate facing the first substrate, and separating the first light-shielding layer from the glass substrate, the first low-refraction layer has a refractive index of 1.25 or less; and a second low-refraction layer attached to a side of the glass substrate facing away from the first substrate, and separating the second light-shielding layer from the glass substrate, the second low-refraction layer has a refractive index of 1.25 or less.

In some embodiments, the reflective liquid crystal display panel further comprises: a cover layer disposed on a side of the second low-refraction layer facing away from the glass substrate.

In some embodiments, the first light-shielding layer further defines an ambient-light passage opening, and the ambient-light passage opening is spaced apart from the light extraction opening and the light exit opening, and the ambient-light passage opening is disposed corresponding to the reflective structure.

In some embodiments, the reflective liquid crystal display panel further comprises: a polarization structure disposed at the ambient-light passage opening; a second filter structure disposed at the ambient-light passage opening and on a side of the polarization structure facing away from the liquid crystal layer; and a third electrode disposed between the first light-shielding layer and the second electrode.

In some embodiments, the reflective liquid crystal display panel further comprises: a second planarization layer isolating the third electrode from the second electrode.

In some embodiments, a direction of a light transmission axis of the polarization structure is at an angle of 45° with a direction of a long axis of liquid crystal molecules of the liquid crystal layer, and a thickness d of the liquid crystal layer satisfies: $\Delta n*d=\lambda/4+m*\lambda$, where $\Delta n$ is refractive index difference for the liquid crystal layer, and $\Delta n=ne-no$, where no is ordinary light refractive index of the liquid crystal layer, ne is extraordinary light refractive index of the liquid crystal layer, $\lambda$ is wavelength of the light incident on the liquid crystal layer, and m is a natural number.

In some embodiments, the ambient-light passage opening is disposed between the light extraction opening and the light exit opening.

In some embodiments, the reflective liquid crystal display panel further comprises: a light source for emitting light to the second substrate.

According to another aspect of the present disclosure, there is provided a display device comprising: a reflective liquid crystal display panel according to any of the embodiments of the present disclosure, and a driving circuit electrically connected to the reflective liquid crystal display panel for providing respective signals to the first electrode and the second electrode to drive the reflective liquid crystal display panel.

According to a further aspect of the present disclosure, there is provided a method for controlling display device, wherein the display device is a display device according to any of the embodiments of the present disclosure, wherein the reflective liquid crystal display panel further comprises a light source for emitting light to the second substrate, the method comprising: in a first mode of operation: turning on the light source, applying, with the driving circuit, electrical signals respectively to the first electrode, the first sub-electrode, and the second sub-electrode, so that light incident to the second substrate by the light source is extracted out by the light extraction structure, and incident onto the reflective structure through the liquid crystal layer, and reflected to the light exit opening and/or the first light-shielding layer by the reflective structure.

In some embodiments, the first light-shielding layer further defines an ambient-light passage opening, and the ambient-light passage opening is provided apart from the light extraction opening and the light exit opening and in correspondence with the reflective structure, wherein the reflective liquid crystal display panel further comprises: a polarization structure disposed at the ambient-light passage opening; a second filter structure disposed at the ambient-light passage opening and on a side of the polarization structure facing away from the liquid crystal layer; and a third electrode disposed between the first light-shielding layer and the second electrode, the method further comprising: in the second operation mode: turning off the light source, applying, with the driving circuit, electrical signals respectively to the first electrode, the first sub-electrode, the second sub-electrode, and the third electrode such that ambient light is incident through the ambient-light passage opening onto the liquid crystal layer, and reflected by the reflective structure to the liquid crystal layer, and is emitted through the ambient-light passage opening.

The additional aspects and advantages of the present application will be set forth in part in or obviously obtained in part from the descriptions which follow, or known through practicing the present disclosure.

BRIEF DESCRIPTION OF THE DRAWINGS

The above and/or additional aspects and advantages of the present disclosure will become apparent and readily understood from the descriptions of the embodiments in association with the drawings as below.

DETAILED DESCRIPTION

Figure 1:
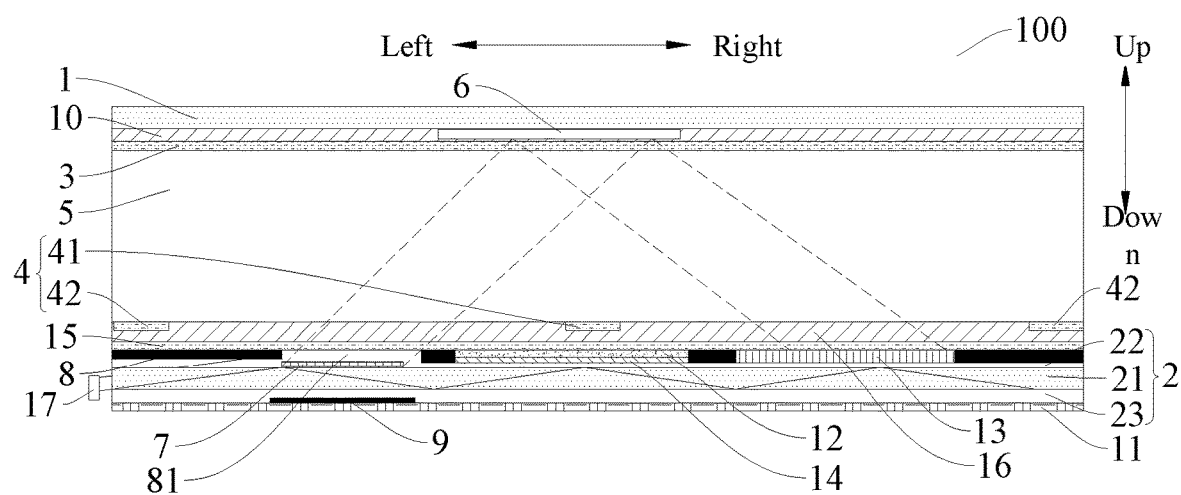
FIG. 1 is a schematic diagram of a single sub-pixel of a reflective liquid crystal display panel according to an embodiment of the present disclosure, wherein the reflective liquid crystal display panel is in a first operation mode and exhibits a bright state display, and the broken lines indicate light propagation.

The embodiments of the present disclosure are described in detail below, and the examples of the embodiments are illustrated in the drawings in which the same or similar reference numerals are used to refer to the same or similar elements or elements having the same or similar functions. The embodiments described below with reference to the accompanying drawings are intended to be illustrative of the present disclosure only, and are not for limiting the scope of the present disclosure.

A reflective liquid crystal display panel 100 according to an embodiment of the present disclosure will be described below with reference to FIGS. 1-5.

As shown in FIG. 1, the reflective liquid crystal display panel 100 according to the embodiment of the present disclosure may comprise a first substrate 1, a second substrate 2, a first electrode 3, a second electrode 4, a liquid crystal layer 5, a reflective structure 6, and a light extraction structure 7, a first light-shielding layer 8, a first filter structure 13, and a second light-shielding layer 9.

The first substrate 1 and the second substrate 2 may each be formed substantially as a plate-like structure. The second substrate 2 is disposed opposite to the first substrate 1. The first electrode 3 is disposed on a side of the first substrate 1 facing the second substrate 2. The second electrode 4 is disposed on a side of the second substrate 2 facing the first substrate 1, and the second electrode 4 is disposed between the second substrate 2 and the first electrode 3. The second electrode 4 may comprise a sub-electrode 41 and a second sub-electrode 42.

The liquid crystal layer 5 is disposed between the first electrode 3 and the second electrode 4. When an electric field is applied between the first electrode 3 and the second electrode 4, the liquid crystal molecules in the liquid crystal layer 5 can be deflected by the electric field. When the light passes through the liquid crystal layer 5, the direction of propagation of the light is changed. Alignment layers may be respectively provided on both sides of the liquid crystal layer 5, so that the upper surface and the lower surface of the liquid crystal layer 5 may be oriented in parallel.

The reflective structure 6 may be disposed between the first substrate 1 and the first electrode 3, for reflecting the light incident on the reflective structure 6. The light extraction structure 7 may be disposed between the second substrate 2 and the second electrode 4, and the light-harvesting structure 7 is configured to cause the light, which sis totally reflected in the second substrate 2, to pass through the liquid crystal layer 5 to the reflective structure 6. That is, the light extraction structure 7 can extract or take out the light, which is totally reflected in the second substrate 2, at a predetermined angle, and the light that is taken passes through the liquid crystal layer 5 to the reflective structure 6 to be reflected by the reflective structure 6, and the taken light can be used for displaying.

The first light-shielding layer 8 is disposed between the second substrate 2 and the second electrode 4. The first light-shielding layer 8 may define a light extraction opening 81 and a light exit opening 82 which are spaced at a distance. The light extraction structure 7 may be disposed in area corresponding to the light extraction opening 81. The light extraction portion 81 may be disposed corresponding to the light extraction structure 7. The light extracted from the second substrate 2 by the light extraction structure 7 can be incident into the liquid crystal layer 5 through the light extraction opening 81, pass through the liquid crystal layer 5, and reflected by the reflective structure 6 back to the liquid crystal layer 5, and finally the light passes through the liquid crystal layer 5 to the light exit opening 82. The first filter structure 13 is disposed at the light exit opening 82. The first filter structure 13 can cover the light exit opening 82, so that the light that is directed toward the light exit opening 82 can be emitted through the first filter structure 13 to enter the environment. Thus, color display of the reflective liquid crystal display panel 100 can be achieved.

In some embodiment, the light extraction structure 7 may be disposed in an area corresponding to the light extraction opening 81, which may comprise, and is not limited to, such a case where the light extraction structure 7 is disposed in the light extraction opening 81. For example, the light-harvesting structure 7 may be disposed outside the light extraction opening 81. In other words, the light extraction structure 7 may be disposed in a same layer as or in a different layer from, the first light-shielding layer 8, as long as the light extraction structure 7 is positioned corresponding to the light extraction opening 81 so that the light taken out from the second substrate 2 by the light extraction structure 7 can pass the light extraction opening 81 and be incident on the liquid crystal layer 5.

The second light-shielding layer 9 is disposed on a side of the second substrate 2 facing away from the first substrate 1. The second light-shielding layer 9 can be disposed corresponding to the light extraction structure 7. Since the light that is totally reflected in the second substrate 2 is taken out by the light extraction structure 7 at a predetermined angle so that incident angle of a part of the light in the second substrate 2 is changed so that the part of the light will not be totally reflected in the second substrate 2, thus the part of the light may be emitted from a side of the second substrate 2 facing away from the first substrate 1. The second light-shielding layer 9 is disposed corresponding to the light-harvesting structure 7, so that the second light-shielding layer 9 can block that part of the light, and that part of the light can be prevented from entering into the environment which otherwise would reduce the CR value of the reflective liquid crystal display panel 100 and deteriorate the contrast of the reflective liquid crystal display panel 100. Thereby, the contrast of the reflective liquid crystal display panel 100 can be improved, the display effect of the reflective liquid crystal display panel 100 can be improved, and user's experience can be improved.

In some embodiments, the second light-shielding layer 9 is disposed corresponding to the light-harvesting structure 7. It can be understood that the second light-shielding layer 9 can block the light leakage caused by the second substrate 2 during the light extraction by the light extraction structure 7. There is no special limitation on the relative position between the second light-shielding layer 9 and the light extraction structure 7. For example, in the direction from the first substrate 1 toward the second substrate 2 (for example, the up-and-down direction in FIG. 1), the second light-shielding layer 9 can be positioned in alignment with the light structure 7, or not directly in alignment with the light structure 7.

In a conventional technology, a part of the light emitted by a front light source is emitted from a side of a light guide plate to realize display, and another part is directly irradiated to the environment and to user's eyes. The light guide plate emits light on the entire surface, and the light that is directly emitted to the environment cannot be blocked. As compared with the conventional technology, in the light-emitting liquid crystal display panel of the present application, the light that would otherwise be directly irradiated into the environment, that is, the light that would otherwise be directly emitted to user's eyes can be effectively block, thereby the contrast of the reflective liquid crystal display panel can be effectively improved. Moreover, the reflective liquid crystal display panel of the present application has a simple structure. In some embodiments, it is not needed to provide a polarizing plate structure, and the thickness and weight of the reflective liquid crystal display panel can be reduced.

In addition, the light extraction structure 7 may be a light extraction grating. Of course, the light extraction structure 7 is not limited thereto, and other light extraction devices/structures may be used as long as the propagation state of the light transmitted through total reflection in the second substrate 2 can be changed so that the light totally reflected inside the second substrate 2 can be emitted from the second substrate 2.

When the reflective liquid crystal display panel 100 is in operation, electrical signals may be respectively applied to the first electrode 3 and the second electrode 4 so that the liquid crystal layer 5 is driven or not driven, and the liquid crystal molecules in the liquid crystal layer 5 are deflected or not deflected, and the light taken out by the light extraction structure 7 is angularly deflected or not angularly deflected in the liquid crystal layer 5, thus the direction of light propagation can be controlled. The liquid crystal layer 5 can be divided into a plurality of independently controlled liquid crystal cells. When different electric fields are applied to the liquid crystal molecules of different regions, in the case that the liquid crystal molecules have different deflection angles, the refractive indices thereof are different, and the light propagation directions are different. In such a way, the light taken out by the light extraction structure 7 can be reflected by the reflection structure 6 to the first light-shielding layer 8 and/or the first light filter structure 13, to achieve a display with different gray-scales (such as 0 to 255 levels of gray-scales display).

Figure 2:
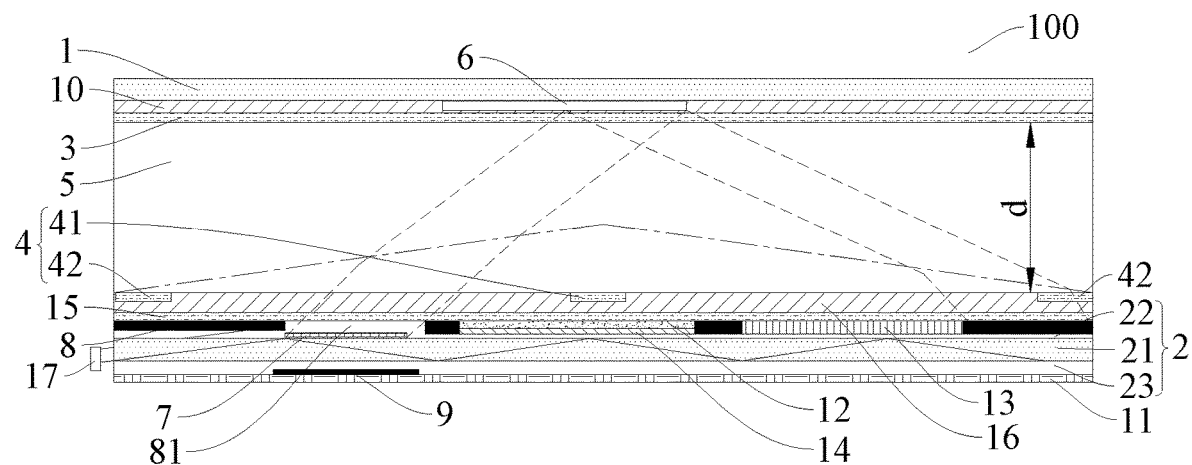
FIG. 2 is a schematic diagram of a single sub-pixel of a transparent display panel shown in FIG. 1, wherein the reflective liquid crystal display panel is in a first operation mode and exhibits a dark state display, and the broken lines indicate light propagation.

For example, the electric field between the first electrode 3 and the second electrode 4 is controlled such that the light taken out of the second substrate 2 by the light extraction structure 7 passes through the liquid crystal layer 5, and is reflected by the reflective structure 6 to be totally irradiated on to the first filter structure 13, thus a Level 255 bright-state display is achieved (as shown in FIG. 1). In another example, the electric field between the first electrode 3 and the second electrode 4 is controlled so that the light taken out from the second substrate 2 by the light extraction structure 7 passes through the liquid crystal layer 5, and is reflected by the reflective structure 6 to be totally irradiated onto the first light-shielding layer 8, thus a Level 0 dark state display is achieved (as shown in FIG. 2). In a further example, the electric field between the first electrode 3 and the second electrode 4 is controlled so that the light extracted from the second substrate 2 by the light structure 7 passes through the liquid crystal layer 5 and is reflected by the reflective structure 6 to be irradiated onto the first filter structure 13 and the first light-shielding layer 8, to realize an intermediate gray scale display. When the reflective liquid crystal display panel 100 performs an intermediate gray scale display, the angle deflection of the light in the liquid crystal layer 5 can be controlled by controlling the electric signals applied to the first electrode 3 and the second electrode 4, thereby controlling the area of the first filter structure 13 irradiated by the light extracted by the light extraction structure 7 to be increased or decreased so as to display with a plurality of gray scales.

It should be noted that, in the "the second electrode 4 comprises the first sub-electrode 41 and the second sub-electrode 42 which are disposed independently of each other", "independent of each other" may be construed as the first sub-electrode 41 and the second sub-electrode 42 are spaced apart, and the first sub-electrode 41 and the second sub-electrode 42 are independently loaded, and voltage loaded to the first sub-electrode 41 and the voltage loaded to the second sub-electrode 42 may be the same or different. The number of the first sub-electrodes 41 and the number of the second sub-electrodes 41 may be specifically set according to actual applications. For a single sub-pixel, the first sub-electrode 41 and the second sub-electrode 42 may be alternately arranged in a left-right direction. The first sub-electrode 41 or the second sub-electrode 42 may be shared between adjacent two sub-pixels.

In the reflective liquid crystal display panel 100 according to the embodiment of the present disclosure, the light extraction opening 81 and the light exit opening 82 are spaced, and the second light-shielding layer 6 is disposed corresponding to the light extraction structure 7 so that the light leakage of the second substrate 2 can be blocked by the second light-shielding layer 9 without influence on the reflective liquid crystal display panel 100 emitting light. Thereby, the contrast of the reflective liquid crystal display panel 100 can be improved, the display performance of the reflective liquid crystal display panel 100 can be improved. Further, the structure of the reflective liquid crystal display panel 100 is simple, which is advantageous for realizing the slim and light design of the reflective liquid crystal display panel 100. In some embodiments, it is not needed to provide a polarizing plate structure, which is further advantageous for realizing the slim and light design of the reflective liquid crystal display panel 100.

The first light-shielding layer 8 and the second light-shielding layer 9 may each be a black matrix (BM), and the first filter structure 13 may be a filter, such as a color filter (CF). When the first filter structure 13 is a color filter, the first filter structure 13 needs to match with the light-take structure 7.

When the light extraction structure 7 is a light extraction grating, due to the diversity of the light extraction grating structures, one type of light extraction grating can take out light in a specific wavelength range, and another type of light extraction grating can take out all visible light.

When the light extraction grating can take out light in a specific wavelength range, the light extraction grating can take out the monochromatic light that is totally reflected and propagated in the second substrate 2. For example, the light extraction grating may include a first light extraction grating, a second light extraction grating, and a third light extraction grating; and the first light extraction grating may take out a first monochromatic light totally reflected in the second substrate 2, the second light extraction grating may take out a second monochromatic light totally reflected in the second substrate 2, and the third light extraction grating may take out a third monochromatic light totally reflected in the second substrate 2. The first monochromatic light, the second monochromatic light and the third monochromatic light can be mixed into white light. As an example, the first monochromatic light is red light, the second monochromatic light is green light, and the third monochromatic light is blue light. For a red sub-pixel, the light extraction grating can take out the red light total reflected in the second substrate 2, and the red light after passing through the first filter structure 13 can still be emitted as red light. For a green sub-pixel, the light extraction grating can take out the green light totally reflected in the second substrate 2, and the green light after passing through the first filter structure 13 can still be emitted as green light. For a blue sub-pixel, the light extraction grating can take out the blue light that is totally reflected in the second substrate 2, and the blue light after passing through the first filter structure 13 can still be emitted as blue light.

For another example, in the examples of FIG. 1 and FIG. 2, for each sub-pixel, the light extraction grating may take out the blue light totally reflected in the second substrate 2. In such a case, for the red sub-pixel, the first filter structure 13 may be a quantum dot color filter (i.e., QDCF) to convert the blue light extracted by the light extraction grating into red light. For the green sub-pixel, the first filter structure 13 may also be a quantum dot color filter to convert the blue light extracted by the light extraction grating into green light. For the blue sub-pixel, the first filter structure 13 retains the blue light extracted by the extraction grating as blue light to emit. Therefore, the structures of the light extraction gratings of the plurality of sub-pixels can be the same, and the first filter structure 13 is simplified, so that the first filter structure 13 does not need to be divided into a plurality of filter units to respectively select light waves of different colors, thereby facilitating the manufacturing of the reflective liquid crystal display panel 100.

The quantum dot color filter can turn the light into divergent light, thereby further satisfying the requirement of multiple viewing angles and colorization of the reflective liquid crystal display panel 100.

Further, the reflective liquid crystal display panel 100 may further comprise a light source 17 that can be positioned to be attached to a side of the second substrate 2, for example, the left side of the second substrate 2 as shown in FIG. 1. The light source 17 is configured to inject light into the second substrate 2. The light can be totally reflected and propagated in the second substrate 2. The light extraction structure 7 takes out the light totally reflected in the second substrate 2 for display. Thus, the reflective liquid crystal display panel 100 can realize a backlight display, for example, realizes a backlight display with the side-injected light, and does not require the user to provide an additional light source. The use convenience of the reflective liquid crystal display panel 100 can be improved.

In some embodiments, the light source 17 can be integrally disposed within the second substrate 2, for example, near the side end faces of the second substrate 2. Therefore, the reflective liquid crystal display panel 100 of the present application can integrate the light source, which is positioned in front in the conventional technology, into the second substrate 2, further simplifying the structure of the reflective liquid crystal display panel 100, and making the reflective liquid crystal display panel 100 thin and light and portable.

It is to be understood that in some embodiments, the reflective liquid crystal display panel 100 does not include the light source 17 as described above. In such a case, the user may use other light sources, such as a flashlight, to inject light into the second substrate 2, and the reflective liquid crystal display panel 100 may also realize a backlight display with the side-entered light.

The light from the light source 17 and incident onto the second substrate 2 may be polarized collimated light, and the deflecting direction of the light may be parallel or coplanar with the long axis direction of the liquid crystal molecules. When the light from the light source 17 and incident on the second substrate 2 is polarized collimated light, a polarizing plate may be disposed on the light incident side of the second substrate 2 to convert the light emitted from the light source 17 into polarized light, and an optical device such as a coupling lampshade or the like may be disposed on the light incident side of the second substrate 2 so that the light emitted from the light source 17 is collimated into the second substrate 2; the present disclosure shall not be limited thereto.

In some embodiments of the present disclosure, the second light-shielding layer 9 is disposed in alignment with the light extraction structure 7. For example, in the examples of FIG. 1 to FIG. 4, the second light-shielding layer 9 and the light extraction structure 7 are disposed facing each other in an up-and-down direction, which facilitates the design of the reflective liquid crystal display panel 100, facilitates the simplification calculations in the design of the reflective liquid crystal display panel 100, and reduces design costs.

When the light extraction structure 7 is a light extraction grating, the incident angle of the incident light of the second substrate 2 and the grating period can be designed such that a part of the light emitted from a side surface of the second substrate 2 facing away from the first substrate 1 through the light extraction structure 7 may be emitted perpendicular to the second substrate 2; and in such a case, may face each other the light emitted as above can be blocked by aligning the second light-shielding layer 9 with the light extraction structure 7.

It should be noted that "the second light-shielding layer 9 and the light extraction structure 7 are disposed facing each other in the up-and-down direction" may be construed as that the center of the second light-shielding layer 9 and the center of the light extraction structure 7 are disposed facing each other in the up-and-down direction.

It can be understood that the second light-shielding layer 9 and the light extraction structure 7 can also be disposed not in alignment with each other, that is, the center of the second light-shielding layer 9 and the center of the light extraction structure 7 are not disposed not in alignment with each other.

In some embodiments of the present disclosure, the area of the second light-shielding layer 9 is larger than the area of the light extraction structure 7, and thus the light-shielding area of the second light-shielding layer 9 is larger than the light extraction area of the light extraction structure 7, and the projection area of the second light-shielding layer 9 on the second substrate 2 is larger than the projection area of the light extraction structure 7 on the second substrate 2; in other words, in the example of FIGS. 1-4, the projection area of the second light-shielding layer 9 is greater than that of the light extraction structure 7 in the up-and-down direction. Therefore, the second light-shielding layer 9 can effectively and completely block the part of the light emitted from the surface of a side the second substrate 2 facing away from the first substrate 1 due to the light extraction structure 7, thereby ensuring the light-shielding of the second light-shielding layer 9, and ensuring the contrast enhancement effect of the reflective liquid crystal display panel 100.

In further embodiments of the present disclosure, as shown in FIG. 1 to FIG. 4, the reflective liquid crystal display panel 100 may further comprise a first planarization layer 10. The first planarization layer 10 may be disposed between the first substrate 1 and the first electrode 3, and the first planarization layer 10 may enclose the reflective structure 6, thereby facilitating the planarization of the first electrode 3, avoiding the first electrode 3 from breakage due to the surface on which the first electrode 3 is provided is not flat due to the arrangement of the reflective structure 6, protecting the first electrode 3, enhancing the reliability of the first electrode 3 in use. In some embodiments, the first electrode 3 may be formed as a planar electrode.

It should be noted that "the first planarization layer 10 encloses the reflective structure 6" can be construed that the reflective structure 6 is embedded in the first planarization layer 10, which may include that the first planarization layer 10 completely wraps around the reflective structure 6 and that the first planarization layer 10 does not completely wrap the reflective structure 6. For example, in the examples of FIGS. 1-4, the first planarization layer 10 completely encloses the reflective structure 6, and both the upper surface and the lower surface of the reflective structure 6 are covered by the first planarization layer 10. For another example, the reflective structure 6 can be not completely enclosed by the first planarization layer 10 may, wherein the upper and/or lower surface of the reflective structure 6 can be not covered by the first planarization layer 10 and is flush with the corresponding surface of the first planarization layer 10.

In some optional embodiments of the present disclosure, the second substrate 2 comprises a glass substrate 21, a first low-refraction layer 22, and a second low-refraction layer 23. The first low-refraction layer 22 is attached to a side of the first substrate 1 facing the glass substrate 21 (for example, the upper side thereof as shown in FIG. 1), and the first low-refraction layer 22 separates the first light-shielding layer 8 from the glass substrate 21. The second low-refraction layer 23 is attached to a side of the substrate 1 facing away from the glass substrate 21 (for example, the lower side thereof as shown in FIG. 1), and the second low-refraction layer 23 separates the second light-shielding layer 9 from the glass substrate 21. In such a way, the structure of the second substrate 2 can be made simple and easy to be implemented, and the total reflection of light in the second substrate 2 can be effectively ensured.

In some embodiments, the refractive indices of the first low-refraction layer 22 and the second low-refraction layer 23 can be both smaller than the refractive index of the glass substrate 21. In a specific example, the refractive index of the first low-refraction layer 22 is 1.25 or less, and the refractive index of the second low-refraction layer 23 is 1.25 or less, so that the critical angle of total reflection occurring in the second substrate 2 is small, thereby reducing the requirements on the incident angle of the incident light for the second substrate 2 and facilitate the setting of the incident light.

Of course, the second substrate 2 can also be formed with other structures, and thus is not limited thereto, as long as the light can be totally reflected and propagated in the second substrate 2.

Further, as shown in FIG. 1 to FIG. 4, the reflective liquid crystal display panel 100 may further comprise a cover layer 11 disposed on a side of the second low-refraction layer 23 facing away from the glass substrate 21. The cover layer 11 may cover a side of the second low-refraction layer 23 facing away from the glass substrate 21, so that the cover layer 11 can protect the second low-refraction layer 23, avoiding wear of the second low-refraction layer 23, and prolonging the life of the reflective liquid crystal display panel 100.

An anti-reflection film layer can be formed on the cover layer 11 by optical coating to prevent contrast deterioration due to ambient light reflection, thereby further ensuring the contrast of the reflective liquid crystal display panel 100. In many applications nowadays, such as mobile phones, it is necessary to provide a touch component on the outer side of the display screen, which needs to be protected by a cover glass (i.e., protection glass). The cover layer 11 of the present application can be used as the protection layer in the mobile phone application; the present disclosure is not limited thereto.

Figure 3:
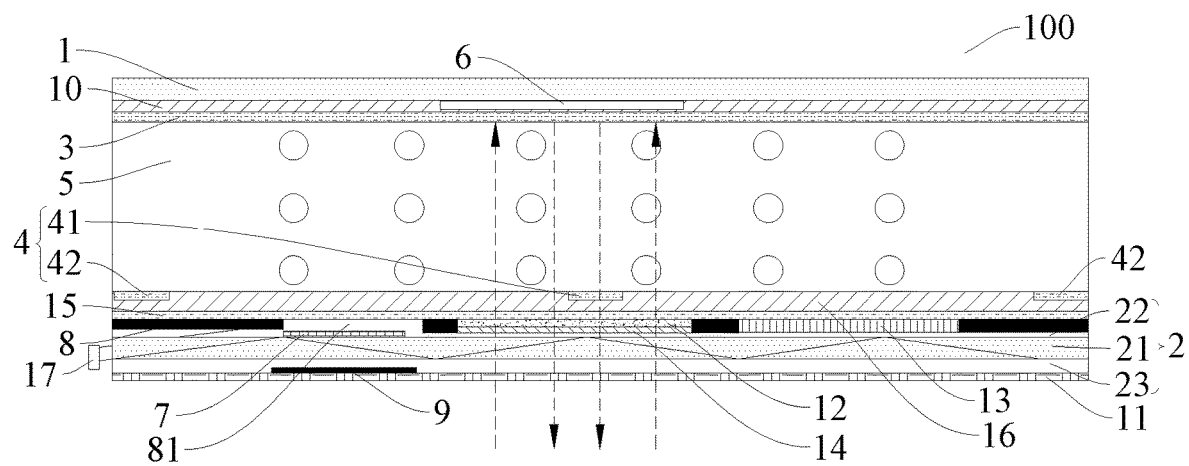
FIG. 3 is a schematic diagram of a single sub-pixel of the transparent display panel shown in FIG. 1, wherein the reflective liquid crystal display panel is in a second operation mode and exhibits a bright state display, and broken lines indicate light propagation.
Figure 4:
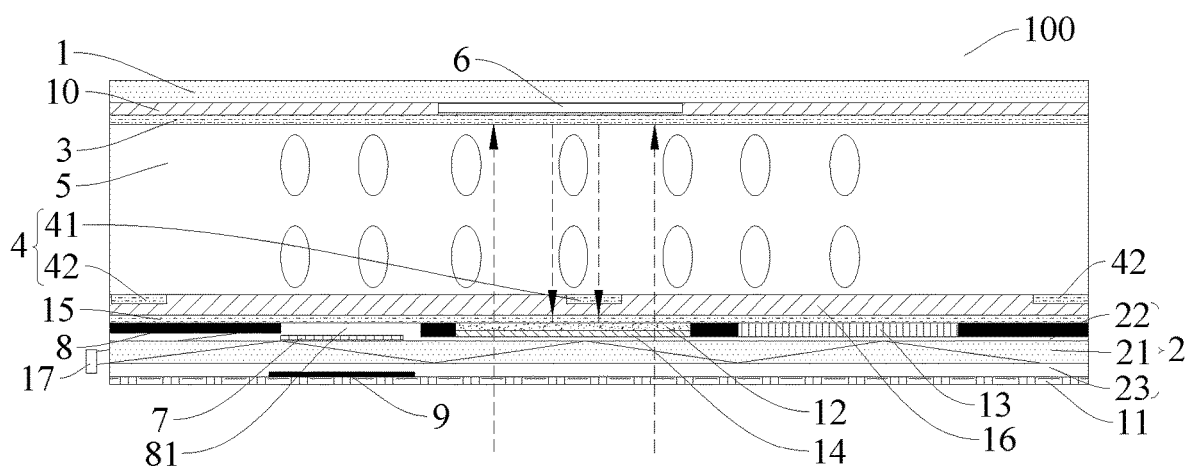
FIG. 4 is a schematic diagram of a single sub-pixel of the transparent display panel shown in FIG. 1, wherein the reflective liquid crystal display panel is in a second operation mode and exhibits a dark state display, and broken lines indicate light propagation.
Figure 5:
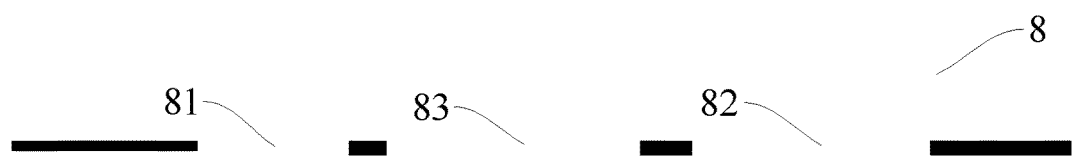
FIG. 5 is a schematic view of a first light-shielding layer shown in FIG. 1.

In some embodiments of the present disclosure, as shown in FIG. 3 to FIG. 5, the first light-shielding layer 8 may further define an ambient-light passage opening 83, and the ambient-light passage opening 83 is spaced apart from the light extraction opening 81 and the light exit opening 82. The ambient-light passage opening 83 may be disposed corresponding to the reflective structure 6, and the ambient light incident from the ambient-light passage opening 83 into the liquid crystal layer 5 can be reflected by the reflective structure 6 to be redirected toward the ambient-light passage opening 83, so that the reflective liquid crystal display panel 100 can perform display with the ambient light.

The reflective liquid crystal display panel 100 may further comprise a polarization structure 12, a second filter structure 14, and a third electrode 15. The polarization structure 12 can function to transmit a single kind of polarized light. The polarization structure 12 can be disposed at the ambient light passage 83. The polarization structure 12 can cover the ambient-light passage opening 83. The second filter structure 14 may be also disposed at the ambient-light passage opening 83, and the second filter structure 14 may be located on a side of the polarization structure 12 facing away from the liquid crystal layer 5. The second filter structure 14 may cover the ambient light passage opening 83 such that the light emitted from the environment to the ambient light passage opening 83 may pass through the second filter structure 14 and the polarization structure 12 in sequence.

The third electrode 15 can be disposed between the first light-shielding layer 8 and the second electrode 4, and the third electrode 15 may be spaced apart from the second electrode 4. Thereby, the signals loaded to the first electrode 3, the second electrode 4, and the third electrode 15 can be separately controlled, so that the reflective liquid crystal display panel 100 can realize display using ambient light in the case where the ambient light is strong.

For example, when the ambient light is strong, when the reflective liquid crystal display panel 100 is in operation, electrical signals are applied to the first electrode 3, the second electrode 4, and the third electrode 15, respectively, so that the ambient light passing through the first ambient-light passage opening 83 and through the second filter structure 14 and the polarization structure 12 and incident on the liquid crystal layer 5 is reflected by the reflective structure 6 and again directed to the ambient-light passage opening 83. By controlling the electrical signals to the first electrode 3, the second electrode 4 and the third electrode 15, the amount of light that is again directed to the ambient light passage opening 83 and passes through the polarization structure 12 can be different, thus the reflective liquid crystal display panel 100 can realize display with different gray scales using the ambient light.

In some embodiments, the polarization structure 12 may be, but is not limited to, a metal wire grid or a wire-grid polarizer (WGP).

Further, as shown in FIG. 1 to FIG. 4, the reflective liquid crystal display panel 100 may further comprise a second planarization layer 16 which isolates the third electrode 15 from the second electrode 4 to avoid signal interference between the second electrode 4 and the third electrodes 15, thereby ensuring stable and reliable operation of the reflective liquid crystal display panel 100. In some embodiments, the second planarization layer 16 can be made of an insulating material to further effectively avoid signal interference between the second electrode 4 and the third electrode 15.

For example, in the examples of FIGS. 1-4, the first sub-electrode 41 and the second sub-electrode 42 are spaced apart, and the first sub-electrode 41 and the second sub-electrode 42 may each be formed as a strip electrode, and the third electrode 15 can be formed as a planar electrode. In such a case, the providing of the second planarization layer 16 can help the third electrode 15 to be planar, avoiding the third electrode 15 from being broken due to the unevenness of the surface, on which the third electrode 15 is disposed, resulted from the structure and distribution of the first sub-electrode 41 and the second sub-electrode 42, thereby protecting the third electrode 15, and further improving the use reliability of the reflective liquid crystal display panel 100.

Further, the second planarization layer 16 may be an insulating member to further effectively avoid signal interference between the second electrode 4 and the third electrode 15.

In some embodiments of the present disclosure, the direction of the light transmission axis of the polarization structure 12 is at an angle of 45° with the long-axis direction of the liquid crystal molecules of the liquid crystal layer 5. The thickness d of the liquid crystal layer 5 may be configured to satisfy: $\Delta n * d = \lambda/4 + m * \lambda$, where $\Delta n$ is the refractive index difference of the liquid crystal layer 5, and $\Delta n = ne - no$, where no is the ordinary refractive index of the liquid crystal layer 5, ne is the extraordinary refractive index of the liquid crystal layer 5, and $\lambda$ is the wavelength of the incident light of the liquid crystal layer 5, m is a natural number. Thereby, with the thickness d of the liquid crystal layer 5 appropriately designed, by controlling the electrical signals to the first electrode 3, the second electrode 4, and the third electrode 15, when the liquid crystal layer 5 is not driven, the ambient light passing the second filter structure 14 and the polarization structure 12 and incident on the liquid crystal layer 5 is reflected by the reflective structure 6 and blocked by the polarization structure 12, and thus the reflective liquid crystal display panel 100 can realize the L0 dark state display with the ambient light. At this time, the reflective liquid crystal display panel 100 can achieve a normally black display with ambient light. Further, by controlling the electrical signals to the first electrode 3, the second electrode 4, and the third electrode 15, when the liquid crystal layer 5 is driven, the ambient light passing through the second filter structure 14 and the polarization structure 12 and incident on the liquid crystal layer 5 is reflected by the reflective structure 6 and can be gradually emitted through the polarization structure 12 and the second filter structure 14, thereby realizing the display with intermediate gray scale and the L255 bright state display.

The display devices according to the embodiments of the second aspect of the present disclosure may comprises a driving circuit and a reflective liquid crystal display panel 100. The reflective liquid crystal display panel 100 is the reflective liquid crystal display panel 100 according to the embodiments of the first aspect of the present disclosure, and the driving circuit is electrically connected to the reflective liquid crystal display panel 100. The driving circuit can respectively apply electrical signals to the first electrode 3, the first sub-electrode 41 and the second sub-electrode 42 such that the reflective liquid crystal display panel 100 can perform display with the backlight in the case that the ambient light brightness is low. In such a way, the contrast of the display device can be improved, and the display performance can be enhanced.

According to the display device of the embodiments of the present disclosure, by using the reflective liquid crystal display panel 100 described above, the contrast of the display device can be improved, and the display performance of the display device can be improved.

According to a third aspect of the present disclosure, control method of a display device is provided, and the display device can be the display device according to the embodiments of the second aspect of the present disclosure. The reflective liquid crystal display panel 100 may further comprises a light source 17 for injecting light into the second substrate 2. The light is totally reflected and propagated in the second substrate 2.

The display device has a first operation mode. In the first operation mode, the light source 17 is turned on, and the driving circuit applies electric signals to the first electrode 3, the first sub-electrode 41, and the second sub-electrode 42 respectively, so that the light emitted by the light source 17 into the second substrate 2 is taken out by the light extraction structure 7, passes through the liquid crystal layer 5, and emits onto the reflective structure 6, and is reflected by the reflective structure 6 to the first filter structure 13 and/or the first light-shielding layer 8.

Figure 6:
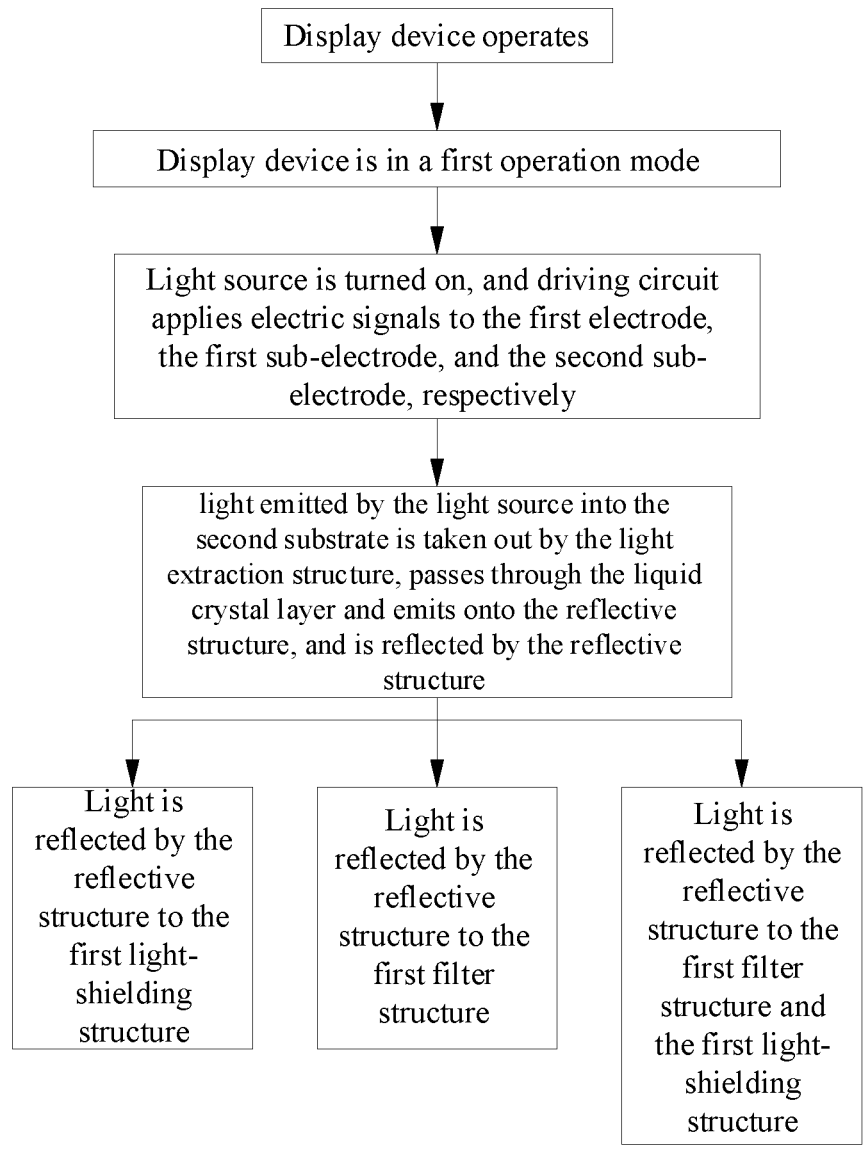
FIG. 6 is a flow chart showing a control method of a display device according to an embodiment of the present disclosure.
Figure 7:
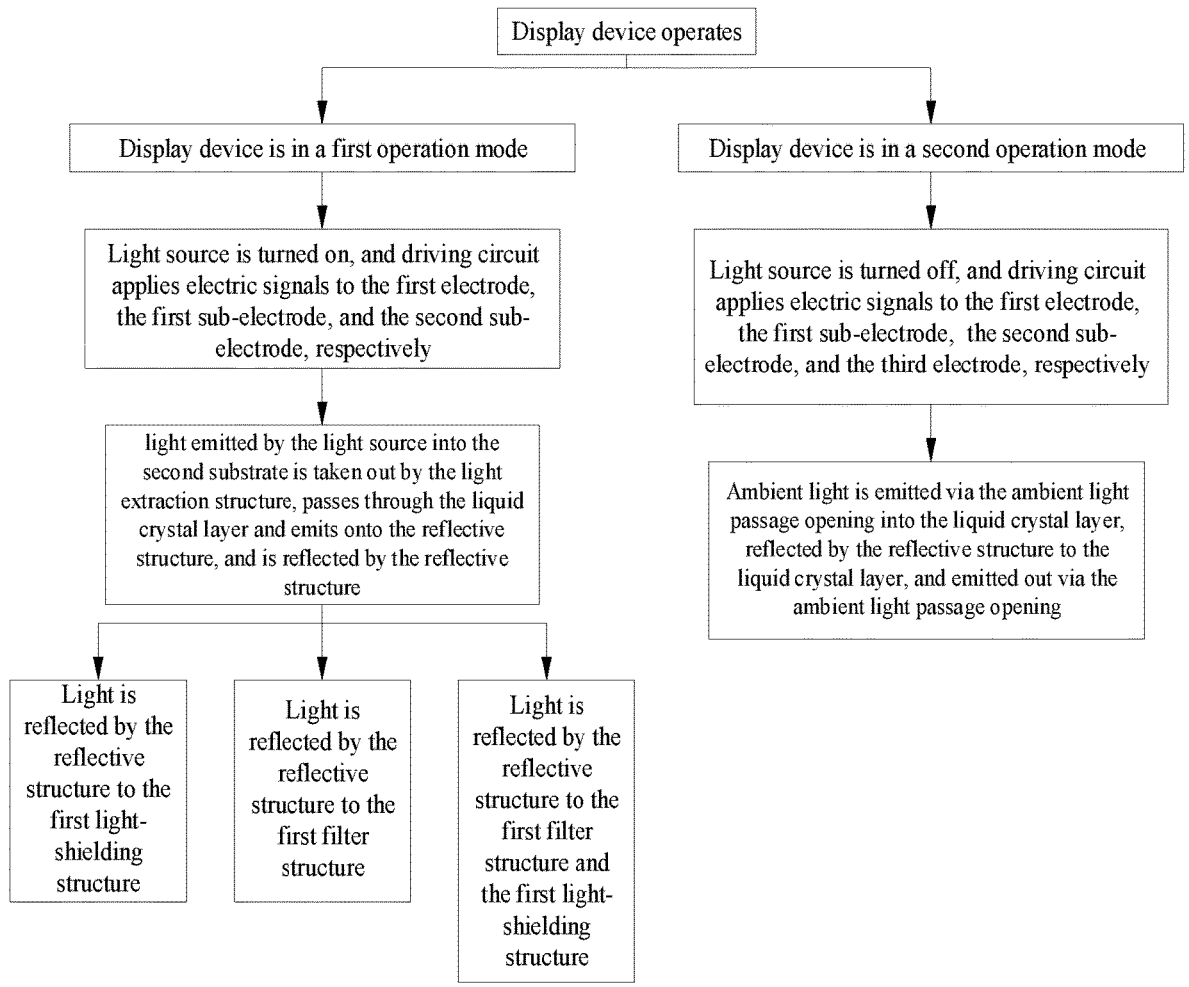
FIG. 7 is a flow chart showing a control method of a display device according to another embodiment of the present disclosure.

Specifically, as shown in FIG. 6 and FIG. 7, when the display device operates, in the case that the ambient light brightness is low, the display device can operate in the first operation mode. When the display device is in the first operation mode, the light source 17 is turned on and emits light on the second substrate 2, and the light is totally reflected and propagated in the second substrate 2. The light-harvesting structure 7 takes out the light totally reflected in the second substrate 2 at a predetermined angle. The driving circuit apply respectively electric signals to the first electrode 3, the first sub-electrode 41, and the second sub-electrode 42, so that the light taken out by the light extraction structure 7 passes through the light extraction opening 81, through the liquid crystal layer 5, and is incident on the reflective structure 6, and then is reflected by the reflective structure 6 to the first filter structure 13 and/or the first light-shielding layer 8. That is, under the action of the liquid crystal layer 5, the reflective structure 6 can reflect all the light taken out by the light extraction structure 7 to the first light-shielding layer 8, or the reflective structure 6 can reflect all the light taken out by the light extraction structure 7 to the first filter structure 13, or the reflective structure 6 can reflect the light taken out by the light extraction structure 7 to the first light-shielding layer 8 and the first filter structure 13; thus the display device can perform display with different gray scales using the backlight.

For example, in the examples of FIGS. 1 and 2, when the display device operates, in the case that the display device is in the first mode of operation, the light source 17 is turned on and emits light to the second substrate 2, and the light totally reflected in the second substrate 2 is taken out by the light extraction structure 7 at a predetermined angle and is incident on the liquid crystal layer 5. The driving circuit can respectively load the first electrode 3, the first sub-electrode 41, and the second sub-electrode 42 with a Vcom signal, that is, the driving circuit loads the first electrode 3 with Vcom signal, the driving circuit loads the first sub-electrode 41 with the Vcom signal, and the driving circuit loads the second sub-electrode 42 with the Vcom signal. At this time, the liquid crystal is not driven, the liquid crystal molecules in the liquid crystal layer 5 are not deflected, and the direction of propagation of the light in the liquid crystal layer 5 is not changed. After the light is reflected by the reflective structure 6, all of the light is irradiated onto the first filter structure 13 to realize the L255 display (as shown in FIG. 1). The driving circuit can load the Vcom signal to the first electrode 3, load the Vcom signal to the first sub-electrode 41, and laod a Vop signal to the second sub-electrode 42. At this time, the liquid crystal is driven, and the liquid crystal molecules in the liquid crystal layer 5 are deflected. In such a case, the liquid crystal layer 5 can be equivalent to an oblique prism, and the light is angularly deflected in the liquid crystal layer 5, so that the light irradiation position is shifted and the light is completely irradiated onto the first light-shielding layer 8 to realize the L0 dark state display (as shown in FIG. 2).

In some embodiments, the driving signal Vcom can be 0 V, and the Vop signal can be the highest voltage signal. The driving circuit can load the Vcom signal to the first electrode 3, the driving circuit applies the Vcom signal to the first sub-electrode 41, and the driving circuit loads the second sub-electrode 42 with a Vop' signal. The Vop' signal can be a signal having a level between the Vcom signal and the Vop signal. The Vop' signal can have a varying voltage. The Vop' signal changes to adjust the capability of the liquid crystal layer 5 to deflect light, so that the area of the first filter structure 13, which is illuminated by the light is increased or decreased to achieve display with different gray scales. As the voltage corresponding to the Vop' signal is getting higher, the bottom angle of the equivalent oblique prism of the liquid crystal layer 5 is larger, and the deflection ability of the liquid crystal layer 5 is stronger, and the deviation of the final illumination position of the light relative to the first filter structure 13 is the greater, thus a part of the light is irradiated on the first filter structure 13 and the other part is irradiated on the first light-shielding layer 8; as such, a display with intermediate gray scales is achieved, and the brightness is lower. When the voltage of the Vop' signal is at the maximum, the driving signal becomes the Vop signal, and the light is all irradiated onto the first light-shielding layer 8, so that the display device is switched to the dark state display and the brightness of the display device is the lowest at this time.

According to the control method for display device according to the embodiments of the present disclosure, the driving manner of the display device is simplified, the contrast of the display device can be improved, and the display device has a good display performance.

In some embodiments of the present disclosure, the first light-shielding layer 8 of the reflective liquid crystal display panel 100 further defines an ambient-light passage opening 83. The ambient-light passage opening 83 may be spaced apart from the light extraction opening 81 and the light exit opening 82, and the ambient-light passage opening 83 may be disposed corresponding to the reflective structure 6. The reflective liquid crystal display panel 100 may further comprise a polarization structure 12, a second filter structure 14, and a third electrode 15. The polarization structure 12 can be disposed at the ambient-light passage opening 83. The polarization structure 12 can cover the ambient-light passage opening 83. The second filter structure 14 may also be disposed at the ambient-light passage opening 83, and the second filter structure 14 may be located on a side of the polarization structure 12 facing away from the liquid crystal layer 5. The second filter structure 14 may cover the ambient light passage opening 83 such that light directed from the environment to the ambient light passage 83 can pass through the second filter structure 14 and the polarization structure 12 in sequence. The third electrode 15 may be disposed between the first light-shielding layer 8 and the second electrode 4, and the third electrode 15 may be spaced apart from the second electrode 4. In such a case, the display device may further have a second operation mode.

Further, as shown in FIG. 1 to FIG. 4, the reflective liquid crystal display panel 100 may further comprise a second planarization layer 16 that isolates the third electrode 15 from the second electrode 4 to avoid signal interference between the second electrode 4 and the three electrodes 15, thereby ensuring operation stability of the display device in the first mode of operation and meanwhile not affecting the second mode of operation of the display device.

In a specific example, the direction of the light transmission axis of the polarization structure 12 is at an angle of 45° with respect to the long-axis direction of the liquid crystal molecules of the liquid crystal layer 5. And the thickness d of the liquid crystal layer 5 may satisfy following equation: $\Delta n * d = \lambda/4 + m*\lambda$, wherein $\Delta n$ is the refractive index difference of the liquid crystal layer 5, and $\Delta n = ne - no$, where no is the ordinary refractive index of the liquid crystal layer 5, and ne is the extraordinary refractive index of the liquid crystal layer 5, $\lambda$ is the wavelength of the light incident on the liquid crystal layer 5, and m is a natural number. Thereby, by appropriately designing the thickness d of the liquid crystal layer 5, the display device can perform display with different gray scales with use of the ambient light in the second operation mode.

The second operational mode of the display device will be further described below with reference to FIGS. 3 to 5 and 7.

In the second mode of operation: the light source 17 is turned off, and the driving circuit applies electrical signals to the first electrode 3, the first sub-electrode 41, the second sub-electrode 42, and the third electrode 15, respectively, so that ambient light passes through the ambient-light passage opening 83 and is incident into the liquid crystal layer 5, and is reflected by the reflective structure 6 to the liquid crystal layer 5, and is emitted from the ambient-light passage opening 83.

Specifically, when the display device operates, in the case that the ambient light brightness is high, the display device can operate in the second operation mode. When the display device is in the second operation mode, the light source 17 can be turned off, and the ambient light passes through the ambient-light passage opening 83, and through the second filter structure 14 and the polarization structure 12; and the driving circuit applies electric signals to the first electrode 3, the first sub-electrode 41, the second sub-electrode 42 and the third electrode 15, respectively, so that the amount of the ambient light reflected by the reflective structure 6 and passing through the ambient light passage opening 83 can be adjusted, thus the display device can realize display with different gray scales using the ambient light.

For example, in the examples of FIGS. 3 and 4, when the display device operates, in the case that the display device is in the second mode of operation, the light source 17 is turned off, and the ambient light passing through the ambient-light passage opening 83 passes through the second filter structure 14 and the polarization structure 12 sequentially. The polarization structure 12 converts the ambient light into polarized light toward the liquid crystal layer 5. The driving circuit can respectively load Vcom signals to the first electrode 3, the first sub-electrode 41, the second sub-electrode 42 and the third electrode 15, that is, the driving circuit applies a Vcom signal to the first electrode 3, a Vcom signal to the first sub-electrode 41, a Vcom signal to the second sub-electrode 42, and a Vcom signal to the third electrode 15. In such case, the liquid crystal layer 5 is not driven, the liquid crystal molecules in the liquid crystal layer 5 are not deflected, and the polarized light is not angularly deflected in the liquid crystal layer 5. The thickness of the liquid crystal layer 5 may be configured such that the polarized light after being reflected by the reflective structure 6 cannot be emitted through the polarizing structure 12, realizing L0 dark state display (as shown in FIG. 4). The driving circuit can load the Vcom signal to the first electrode 3, a Vop signal to the first sub-electrode 41, the Vop signal to the second sub-electrode 42, the Vop signal to the third electrode 15. At this time, the vertical electric field formed by the first electrode 3, the second electrode 4 and the third electrode 15 can drive the liquid crystal to be deflected, so that the liquid crystal molecules are erected on the whole surface, and the polarized light is reflected by the reflective structure 6 and sequentially passes through the polarizing structure 12 and the second filter structure 14 to realize the L255 bright state display (as shown in FIG. 3).

In some embodiments, the driving signal Vcom may be 0V, and the Vop signal may be a signal with highest voltage. The driving circuit may respectively apply the Vop' signal to the first electrode 3, the first sub-electrode 41, the second sub-electrode 42 and the third electrode 15, the Vop' signal is a signal between the Vcom signal and the Vop signal. The Vop' signal can have a varying voltage. And the Vop' signal changes to adjust the transmission amount of the polarized light passing through the polarization structure 12 (or, the intensity of the outgoing light), thereby achieving display with different gray scales. The brightness is higher as the Vop' signal is increased. When the Vop' signal voltage is maximized, the driving signal becomes the Vop signal, and the amount of the polarized light passing through the polarizing structure 12 is maximized, so that the display device switches to the bright state display. At this time, the display device has the highest brightness.

In some embodiments, the ambient light passage opening 83 can be disposed in alignment with the reflecting structure 6, so that ambient light incident into the liquid crystal layer 5 through the ambient light passage opening 83 can be vertically incident on the reflecting structure 6 and vertically reflected by the reflecting structure 6 to ambient light passage opening 83, thus the design of the reflective liquid crystal display panel 100 is simplified.

Other configurations and operations of display devices in accordance with embodiments of the present disclosure can be known by those of ordinary skills in the art from present disclosure, and thus will be omitted from being described in detail herein.

A reflective liquid crystal display panel 100, a display device, and a control method thereof according to some embodiments of the present disclosure will be described in detail below with reference to FIGS. 1 to 5 and FIG. 7 with a detail example. It is to be understood that the following descriptions are only illustrative and not restrictive.

As shown in FIG. 1 to FIG. 5, the reflective liquid crystal display panel 100 may comprise a first substrate 1, a second substrate 2, a first electrode 3, a second electrode 4, a liquid crystal layer 5, a reflective structure 6, a light extraction structure 7, and a first a light-shielding layer 8, a first filter structure 13, a second light-shielding layer 9, a first planarization layer 10, a cover layer 11, a polarization structure 12, a second filter structure 14, a third electrode 15, a second planarization layer 16, and a light source 17. The first electrode 3, the first sub-electrode 41, the second sub-electrode 42 and the third electrode 15 can all be made of transparent conductive material such as Indium Tin Oxide (ITO), but shall not be limited thereto.

The first substrate 1 and the second substrate 2 may each be formed substantially in a plate-like structure, and the second substrate 2 is disposed opposite to the first substrate 1. The first substrate 1 may be a glass plate. The second substrate 2 may comprise a glass substrate 21, a first low-refraction layer 22 and a second low-refraction layer 23. The first low-refraction layer 22 is attached to a side of the glass substrate 21 facing the first substrate 1, and the second low-refraction layer 23 is attached to a side of the glass substrate 21 facing away from the first substrate 1. The cover layer 11 is disposed on a side of the second low-refraction layer 23 facing away from the glass substrate 21. The cover layer 11 may cover the surface of the side of the second low-refraction layer 23 facing away from the glass substrate 21. In some implementations, the refractive index of the first low-refraction layer 22 and the second low-refraction layer 23 are both equal to or less than 1.25. The first low-refraction layer 22 and the second low-refraction layer 23 may both be made of insulating material, that is, the first low-refraction layer 22 and the second low-refraction layer 23 may have insulating properties.

The first electrode 3 is formed as a planar electrode, and the first electrode 3 is disposed between the first substrate 1 and the first low-refraction layer 22. The second electrode 4 is disposed between the first low-refraction layer 22 and the first electrode 3. The second electrode 4 comprises a first sub-electrode 41 and two second sub-electrodes 42. The first sub-electrode 41 and the two second sub-electrodes 42 are disposed independently of each other. In the up and down direction, the upper and/or lower surfaces of the first sub-electrode 41 and the two second sub-electrodes 42 are arranged in alignment, respectively. In the left-right direction, the first sub-electrode 41 is disposed between the two second sub-electrodes 42, and the orthographic projections of the adjacent first sub-electrodes 41 and the second sub-electrodes 42 on the second substrate 2 are spaced apart. The first sub-electrode 41 and the second sub-electrode 42 can be strip electrodes extending in a direction perpendicular to the plane of the paper, respectively.

The liquid crystal layer 5 is disposed between the first electrode 3 and the second electrode 4. The reflective structure 6 is disposed between the first substrate 1 and the first electrode 3. The reflective structure 6 may be disposed on a surface of a side of the first substrate 1 facing the second substrate. The reflective structure 6 is used to reflect the light incident thereon.

The light source 17 is provided on the left side of the second substrate 2 to inject light into the glass substrate 21, and the light is totally reflected and propagated in the glass substrate 21. The light extraction structure 7 is disposed between the second substrate 2 and the second electrode 4, and the light extraction structure 7 is configured to take out the light totally reflected in the second substrate 2 to pass through the liquid crystal layer 5 to the reflective structure 6, and the light taken out can be used for display. In some embodiments, the light extraction structure 7 may be a light extraction grating. In such a case, the light extraction grating may be formed on the upper surface of the glass substrate 21.

The first light-shielding layer 8 is disposed between the second substrate 2 and the second electrode 4. The first low-refraction layer 22 separates the glass substrate 21 from the first light-shielding layer 8. The first light-shielding layer 8 defines a light extraction opening 81, a light exit opening 82, and an ambient light passage opening 83 which are spaced apart. The light extraction opening 81 is disposed corresponding to the light extraction structure 7, so that the light taken out from the second substrate 2 by the light extraction structure 7 is incident through the light extraction opening 81 into the liquid crystal layer 5, passes through the liquid crystal layer 5 and is reflected by the reflective structure 6 to the liquid crystal layer 5, and finally the light again passes through the liquid crystal layer 5 to the light exit opening 82. The first filter structure 13 is disposed at the light exit opening 82. The first filter structure 13 can cover the light exit 82 such that the light directed to the light exit 82 can all exit through the first filter structure 13 to enter the environment.

It can be understood that the specific position and the area of the reflective structure 6 can be determined according to the size and the angle of the light extraction of the light extraction grating so that the light taken out by the light extraction grating can pass through the liquid crystal layer 5 and be irradiated onto the reflective structure 6, and then be reflected by the reflective structure 6 to the first light-shielding layer 8 and/or the first filter structure 13.

As shown in FIG. 3 to FIG. 5, the ambient light passage opening 83 and the reflecting structure 6 are disposed opposite to each other, and the ambient light incident from the ambient-light passage opening 83 into the liquid crystal layer 5 can be vertically incident on the reflecting structure 6 and vertically reflected by the reflecting structure 6 to the ambient-light passage opening 83. The polarization structure 12 and the second filter structure 14 are both disposed at the ambient-light passage opening 83, and both the polarization structure 12 and the second filter structure 14 can cover the ambient-light passage opening 83. The third electrode 15 is formed as a planar electrode, and the third electrode 15 is disposed between the first light-shielding layer 8 and the second electrode 4. The third electrode 15 and the second electrode 4 are spaced apart from each other in the up and down direction with a second planarization layer 16 isolating the third electrode 15 from the second electrode 4. A portion of the second planarization layer 16 is filled between the adjacent first sub-electrode 41 and second sub-electrode 42.

In some embodiments, the direction of the light transmission axis of the polarization structure 12 is at an angle of 45° with respect to the long-axis direction of the liquid crystal molecules of the liquid crystal layer 5. The thickness d of the liquid crystal layer 5 may be configured to satisfy the following equation: $\Delta n*d=\lambda/4+m*\lambda$, wherein $\Delta n$ is a refractive index difference of the liquid crystal layer 5 and $\Delta n=ne-no$, where no is the ordinary refractive index of the liquid crystal layer 5, ne is the extraordinary refractive index of the liquid crystal layer 5, $\lambda$ is the wavelength of the light incident on the liquid crystal layer 5, and m is a natural number. For example, if the orientation of the long axis of the liquid crystal molecules in FIG. 3 is along the direction perpendicular to the paper, the direction of the light transmission axis of the polarization structure 12 is configured to be at an angle of 45° with respect to the direction vertical to the paper plane.

The second light-shielding layer 9 is disposed on a side of the second substrate 2 facing away from the first substrate 1. The second low-refraction layer 23 is disposed to separate the glass substrate 21 from the second light-shielding layer 9. The second light-shielding layer 9 and the light extraction structure 7 is disposed in alignment with each other, and the area of the second light-shielding layer 9 is larger than the area of the light extraction structure 7 to block light leakage from the side of the second substrate 2 facing away from the first substrate 1. The first planarization layer 10 is disposed between the first substrate 1 and the first electrode 3, and the first planarization layer 10 encloses the reflective structure 6.

The reflective liquid crystal display panel according to the embodiments of the present disclosure can be compatible with different brightness environments to meet the display requirements in different brightness environments. According to the reflective liquid crystal display panel of the embodiments of the present disclosure, the contrast of the reflective liquid crystal display panel can be improved, and the display performance of the reflective liquid crystal display panel can be improved. Further, the structure of the reflective liquid crystal display panel is simplified, which is advantageous for implementing the thin and light design of the reflective liquid crystal display panel. In some embodiments, it is not needed to provide a polarizing plate structure, which is also advantageous for implementing the thin and light design of the reflective liquid crystal display panel.

A display device according to an embodiment of the present disclosure may comprise the reflective liquid crystal display panel 100 and a driving circuit. The driving circuit is electrically connected to the reflective liquid crystal display panel 100. The driving circuit can apply electrical signals to the first electrode 3, the first sub-electrode 41, the second sub-electrode 42, and the third electrode 15 respectively, so that the transparent display panel 100 can use the backlight to perform display when the ambient light brightness is low, and use the ambient light for display when the ambient light brightness is high. The contrast of the display device can be improved, and the display device can render excellent display performance.

The display device may has a first operation mode and a second operation mode. As shown in FIGS. 1, 2 and 7, in the first operation mode, the light source 17 is turned onto emit light on the second substrate 2, and the light totally reflected in the second substrate 2 is taken out by the light extraction structure 7 at a predetermined angle and directed through the light extraction opening 81 to the liquid crystal layer 5. The driving circuit can respectively load the first electrode 3, the first sub-electrode 41, the second sub-electrode 42 and the third electrode 15 with the Vcom signals, that is, the driving circuit loads a Vcom signal to the first electrode 3, loads a Vcom signal to the first sub-electrode 41, loads a Vcom signal to the second sub-electrode 42, and loads a Vcom signal to the third electrode 15. In such a case, the liquid crystal is not driven, the liquid crystal molecules in the liquid crystal layer 5 are not deflected, the direction of propagation of the light in the liquid crystal layer 5 is not changed, and the light is reflected by the reflective structure 6 and then totally irradiated onto the first filter structure 13, thus realizing the L255 bright state display (as shown in FIG. 1). The driving circuit may apply a Vop signal to the second sub-electrode 42, and the signals loaded the first electrode 3, the first sub-electrode 41 and the third electrode 15 are not changed. In such a case, the liquid crystal is driven, the liquid crystal molecules in the liquid crystal layer 5 are deflected. At this time, the liquid crystal layer 5 can be equivalent to a symmetric oblique prism and the light is angularly deflected in the liquid crystal layer 5, so that the light irradiation position is shifted to the right, and the light is completely irradiated to the first light-shielding layer 8. Thus, the L0 dark state display is implemented (as shown in FIG. 2). The driving circuit may apply a Vop' signal to the second sub-electrode 42, and the signals loaded to the first electrode 3, the first sub-electrode 41 and the third electrode 15 are not changed. In such a case, the liquid crystal is driven, and the liquid crystal molecules in the liquid crystal layer 5 are deflected. At this time, the liquid crystal layer 5 can be equivalent to a symmetric oblique prism and the light is angularly deflected in the liquid crystal layer 5, so that the light irradiation position is shifted to the right from the first filter structure 13, and the light is respectively irradiated to the first filter structure 13 and the first light-shielding layer 8. Thus, an intermediate gray scale display is realized.

As shown in FIG. 3, FIG. 4 and FIG. 7, in the second mode of operation, the light source 17 can be turned off, and the ambient light passes through the second light filter structure 14 and the polarization structure 12 via the ambient-light passage opening 83, and the polarization structure 12 converts the ambient light into polarized light and direct it to the liquid crystal layer 5. The driving circuit applies a Vcom signal to the first electrode 3, a Vcom signal to the first sub-electrode 41, and a Vcom signal to the second sub-electrode 42, and a Vcom signal to the third electrode 15. In such a case, the liquid crystal is not driven, the liquid crystal molecules in the liquid crystal layer 5 are not deflected, and the polarized light is not angularly deflected in the liquid crystal layer 5. The thickness of the liquid crystal layer 5 can be configured such that the polarized light after being reflected by the reflective structure 6 cannot be transmitted through the polarization structure 12, thus, a L0 dark state display is realized (as shown in FIG. 4). The driving circuit may apply the Vcom signal to the first electrode 3, the Vop signal to the first sub-electrode 41, the Vop signal to the second sub-electrode 42, and the Vop signal to the third electrode 15. In such case, the vertical electric field formed by the first electrode 3, the second electrode 4, and the third electrode 15 can drive the liquid crystal to deflect, so that the liquid crystal molecules are erected on the whole surface, and the polarized light is reflected by the reflective structure 6 and then sequentially passed through the polarizing structure 12 and the second filter structure 14, thus a L255 bright state display is realized (as shown in FIG. 3). The driving circuit may apply the Vcom signal to the first electrode 3, the Vop' signal to the first sub-electrode 41, the Vop' signal to the second sub-electrode 42, the Vop' signal to the third electrode 15. In such a case, the polarized light is reflected by the reflective structure 6 and sequentially passes through the polarizing structure 12 and the second filter structure 14. When the deflection angle of the light is different, the transmission amount of the light through the polarization structure 12 is different. Thus, intermediate gray scale display is achieved.

In some embodiments, the Vop' signal is a changing signal between the Vcom signal and the Vop signal (excluding the Vcom signal and the Vop signal).

According to the control method for display device of the embodiments of the present disclosure, the driving mode of the display device is simplified, good contrast can be obtained in both the first operation mode and the second operation mode, and the display device has a good display performance.

In the description of the present disclosure, it is to be understood that the orientation or positional relationship indicated by the terms such as "center", "upper", "lower", "left", "right", "vertical", "horizontal", etc. is based on the orientation or positional relationship shown in the drawings, and is merely for the convenience and simplifying of description of the present disclosure, and thus is not intended to indicate or imply that a device or component related necessarily only have the specified orientation or be constructed and operated in the specified orientation only, and therefore shall not be construed as limitations on the scope of the present disclosure. In the description of the present disclosure, "plurality" means two or more.

In the description of the present specification, the description with reference to the terms "an embodiment", "embodiments", "illustrative embodiment(s)", "example(s)", "specific example(s)", "some examples", or the like is intended to indicate that particular feature(s), structure(s), material(s), characteristic(s), or the like described with reference to the term(s) is/are included in at least one embodiment or example of the present disclosure. In the present specification, the schematic representation of the above terms does not necessarily mean the same embodiment or example. Furthermore, particular features, structures, materials, or characteristics described may be combined in a suitable manner in any one or more embodiments or examples.

While the embodiments of the present disclosure have been shown and described, various changes, modifications, substitutions, or variations can be made by those skilled in the art to the embodiments without departing from the spirit and scope of the present disclosure, and thus the scope of the present disclosure is defined by the claims and their equivalents.

What is claimed is:

1. A reflective liquid crystal display panel comprising:
   a first substrate;
   a second substrate disposed opposite to the first substrate;
   a liquid crystal layer disposed between the first substrate and the second substrate;
   a layer of a first electrode disposed on a side of the first substrate facing the second substrate and between the first substrate and the liquid crystal layer;
   a layer of a second electrode disposed on a side of the second substrate facing the first substrate and between the second substrate and the liquid crystal layer, the layer of the second electrode comprising a first sub-electrode and a second sub-electrode disposed independently of each other;
   a reflective structure disposed between the first substrate and the layer of the first electrode;
   a first light-shielding layer disposed on the second substrate and between the second substrate and the layer of the second electrode, the first light-shielding layer having a plurality of openings including a light-extraction opening; and
   a light extraction structure disposed on the second substrate in correspondence with the light-extraction opening and between the second substrate and the layer of the second electrode, and configured to extract light from the second substrate and pass the extracted light through the light-extraction opening and the liquid crystal layer to the reflective structure.

2. The reflective liquid crystal display panel according to claim 1,
   wherein the plurality of openings including a light exit opening spaced apart from the light-extraction opening, and configured to emit therethrough the light which is reflected back by the reflective structure,
   the reflective liquid crystal display panel further comprising:
   a first filter structure disposed at the light exit opening; and
   a second light-shielding layer disposed on a side of the second substrate facing away from the first substrate, and disposed opposite to the light extraction structure.

3. The reflective liquid crystal display panel according to claim 2, wherein the light incident to the reflective structure is reflected through the liquid crystal layer to any one of:
   the light exit opening and/or the first light-shielding layer.

4. The reflective liquid crystal display panel according to claim 2, wherein the second light-shielding layer is configured such that
   an orthogonal projection of the second light-shielding layer on the second substrate covers an orthogonal projection of the light extraction structure on the second substrate.

5. The reflective liquid crystal display panel according to claim 4, wherein an area of the orthogonal projection of the second light-shielding layer is larger than an area of the orthogonal projection of the light extraction structure.

6. The reflective liquid crystal display panel according to claim 2, wherein the first light-shielding layer further defines an ambient-light passage opening, and the ambient-light passage opening is spaced apart from the light-extraction opening and the light exit opening, and the ambient-light passage opening is disposed corresponding to the reflective structure.

7. The reflective liquid crystal display panel according to claim 6, further comprising:
   a polarization structure disposed at the ambient-light passage opening;
   a second filter structure disposed at the ambient-light passage opening and on a side of the polarization structure facing away from the liquid crystal layer; and
   a layer of a third electrode disposed between the first light-shielding layer and the layer of the second electrode.

8. The reflective liquid crystal display panel according to claim 7, further comprising:
   a second planarization layer isolating the third electrode from the second electrode.

9. The reflective liquid crystal display panel according to claim 7, wherein a direction of a light transmission axis of the polarization structure is at an angle of 45° with a direction of a long axis of liquid crystal molecules of the liquid crystal layer, and a thickness d of the liquid crystal layer satisfies: $\Delta n*d=\lambda/4+m*\lambda$, where $\Delta n$ is refractive index difference for the liquid crystal layer, and $\Delta n=ne-no$, where no is ordinary light refractive index of the liquid crystal layer, ne is extraordinary light refractive index of the liquid crystal layer, $\lambda$ is wavelength of the light incident on the liquid crystal layer, and m is a natural number.

10. The reflective liquid crystal display panel according to claim 6, wherein the ambient-light passage opening is disposed between the light-extraction opening and the light exit opening.

11. A display device comprising:
a reflective liquid crystal display panel according to claim 2, and
a driving circuit electrically connected to the reflective liquid crystal display panel for providing respective signals to the first electrode and the second electrode to drive the reflective liquid crystal display panel.

12. A method for controlling display device,
wherein the display device is a display device according to claim 11,
wherein the reflective liquid crystal display panel further comprises a light source for emitting light to the second substrate,
the method comprising:
in a first mode of operation:
turning on the light source,
applying, with the driving circuit, electrical signals respectively to the first electrode, the first sub-electrode, and the second sub-electrode, so that light incident to the second substrate by the light source is extracted out by the light extraction structure, and incident onto the reflective structure through the liquid crystal layer, and reflected to the light exit opening and/or the first light-shielding layer by the reflective structure.

13. The method according to claim 12, wherein the first light-shielding layer further defines an ambient-light passage opening, and the ambient-light passage opening is provided apart from the light-extraction opening and the light exit opening and in correspondence with the reflective structure,
wherein the reflective liquid crystal display panel further comprises:
a polarization structure disposed at the ambient-light passage opening;
a second filter structure disposed at the ambient-light passage opening and on a side of the polarization structure facing away from the liquid crystal layer; and
a third electrode disposed between the first light-shielding layer and the second electrode,
the method further comprising:
in a second operation mode:
turning off the light source,
applying, with the driving circuit, electrical signals respectively to the first electrode, the first sub-electrode, the second sub-electrode, and the third electrode such that ambient light is incident through the ambient-light passage opening onto the liquid crystal layer, and reflected by the reflective structure to the liquid crystal layer, and is emitted through the ambient-light passage opening.

14. The reflective liquid crystal display panel according to claim 1, further comprising:
a first planarization layer disposed between the first substrate and the layer of the first electrode, wherein the reflective structure is disposed in the first planarization layer.

15. The reflective liquid crystal display panel according to claim 1, wherein the second substrate comprises:
a glass substrate;
a first low-refraction layer attached to a side of the glass substrate facing the first substrate, and separating the first light-shielding layer from the glass substrate, the first low-refraction layer has a refractive index of 1.25 or less; and
a second low-refraction layer attached to a side of the glass substrate facing away from the first substrate, and separating a second light-shielding layer from the glass substrate, the second low-refraction layer has a refractive index of 1.25 or less.

16. The reflective liquid crystal display panel according to claim 15, further comprising:
a cover layer disposed on a side of the second low-refraction layer facing away from the glass substrate.

17. The reflective liquid crystal display panel according to claim 1, further comprising:
a light source for emitting light to the second substrate.

* * * * *